United States Patent [19]

Lalancette et al.

[11] 4,356,057

[45] Oct. 26, 1982

[54] PHOSPHATED ASBESTOS FIBERS

[75] Inventors: Jean M. Lalancette; Jacques Dunnigan, both of Sherbrooke, Canada

[73] Assignee: Societe Nationale de l'Amiante, Quebec, Canada

[21] Appl. No.: 266,135

[22] Filed: May 21, 1981

[30] Foreign Application Priority Data

May 27, 1980 [CA] Canada .................................. 352938
Apr. 29, 1981 [CA] Canada .................................. 375388

[51] Int. Cl.$^3$ .............................................. C03B 37/00
[52] U.S. Cl. ...................................... 162/3; 106/306;
162/80; 162/153; 423/167; 427/255; 428/443;
501/95
[58] Field of Search ................. 501/95; 427/213, 215,
427/255, 255.1; 106/306; 423/167; 162/3, 80;
428/443

[56] References Cited

U.S. PATENT DOCUMENTS

| | | | |
|---|---|---|---|
| 3,403,038 | 9/1968 | Abolins et al. | 501/111 |
| 3,458,393 | 7/1969 | Battista | 162/3 |
| 3,535,150 | 10/1970 | Lipsett | 428/443 X |
| 4,168,347 | 9/1979 | Spicuzza et al. | 428/532 |
| 4,171,405 | 10/1979 | Pezzoli | 428/443 |
| 4,192,707 | 3/1980 | Glass et al. | 162/3 |

OTHER PUBLICATIONS

G. Macnab et al., Nature, vol. 214, 1967, pp. 522–523.
H. Hayashi, Envir. Health Persp., vol. 9, 1974, pp. 267–270.
A. C. Allison et al., Ann. Rheum. Disease, 1977, 36, Supplement pp. 8–13.
A. M. Langer et al., J. Toxic. and Envir. Health, 4 pp. 173–188, 1978.
R. J. Schnitzer et al., Envir. Res. 3, pp. 1–13, 1970.
Fourth International Conference on Asbestos, Torino, 26–30, May 1980.
M. Chamberlain et al., Br. J. Exp. Path. 59, pp. 183–189.

*Primary Examiner*—Helen M. McCarthy
*Attorney, Agent, or Firm*—Cushman, Darby & Cushman

[57] ABSTRACT

There is disclosed chemically modified chrysotile asbestos fibers, more particularly phosphated asbestos fibers containing from 0.5 to 5% by weight of phosphate groups and heat treated phosphated asbestos fibers, both of which have an infrared spectrum which exhibits substantially no absorption within the range of 954–1080 cm$^{-1}$. The novel phosphated asbestos fibers are characterized by reduced haemolytic and cytotoxic activities.

7 Claims, 3 Drawing Figures

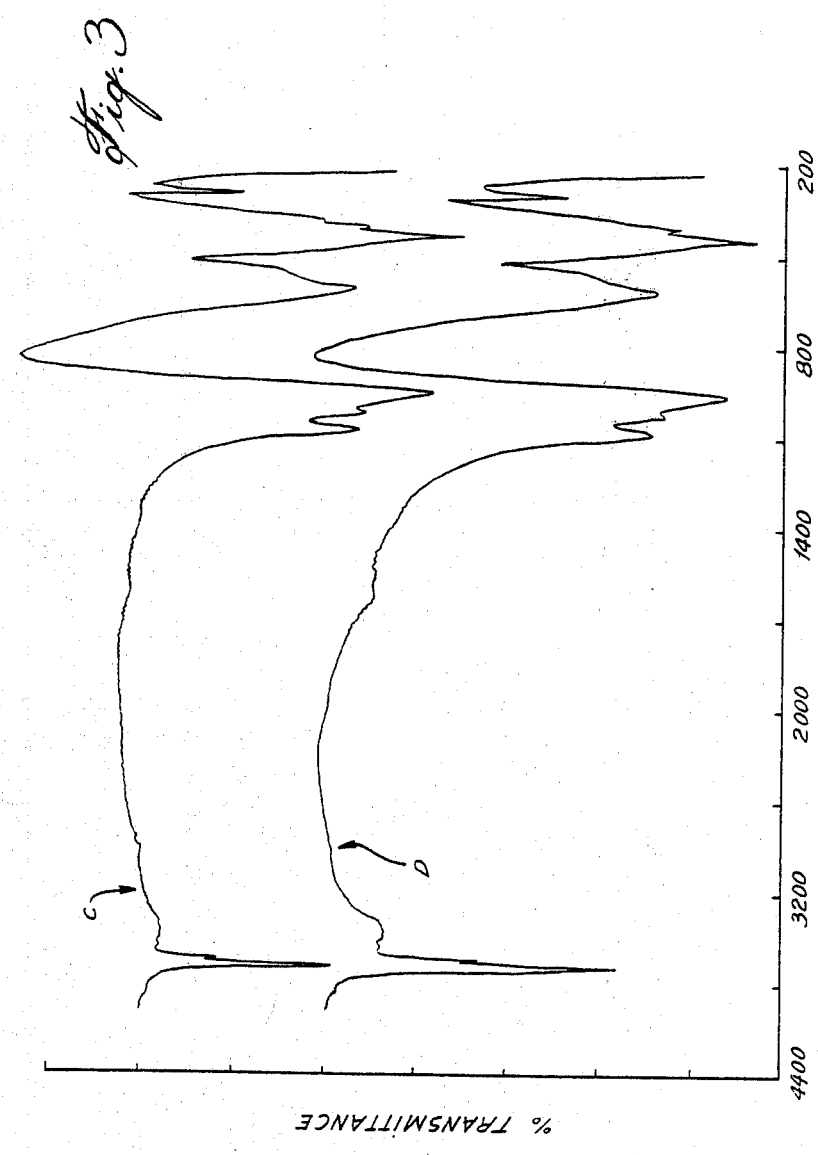

PHOSPHATED ASBESTOS FIBERS

FIELD OF THE INVENTION

The present invention relates to a method of treating chrysotile asbestos fibers to reduce some of the undesirable effects associated with asbestos fibers and to industrial products made therefrom.

BACKGROUND OF THE INVENTION

The term "asbestos" refers to a group of naturally occurring silicate minerals of commercial importance because of their fibrous nature. Chrysotile asbestos, by far the most important variety, is a hydrated magnesium silicate having the general formula $Mg_3Si_2O_5(OH)_4$ which is characterized by the presence of magnesium hydroxide groups on the exterior surface of the fibers.

There are a number of publications dealing with the surface modification of asbestos fiber with a view of modifying certain physico-chemical properties of asbestos fibers such as improved filtration characteristics of the fibers, enhanced tensile strength, improvement of flame resistance, water-proofing of the fibers for the manufacture of water repellent fabrics, dispersion of the fibers, and reduction of the emission of the fibers during handling and use of finished asbestos-containing products.

Of particular interest to both producers and users of asbestos fibers has been the potential health problem allegedly associated with asbestos exposure. The National Safety Council has reported that persons inhaling large amounts of asbestos dust can develop disabling or fatal pulmonary and pleural fibrosis also known as asbestosis and various types of malignancy of the respiratory tract ("Asbestos", National Safety Council Newsletter, R & D Section, June 1974). There is also a belief that asbestos may cause various forms of carcinogenesis, particularly carcinoma of the lung.

Because of the apparent pathogenicity of asbestos fibers, there has been a general reaction of the public and certain health authorities regarding the use of products containing asbestos fibers. This has led to a certain amount of research to modify asbestos fibers in such a way as to reduce as much as possible the undesirable biological effects of asbestos fibers.

Various materials have been examined which interact with the surface of asbestos fibers and reduce its haemolytic activity. Such material includes disodium ethylenediamine tetraacetic acid (EDTA), simple phosphates, disodium versenate, polyvinylpyridine N-oxide and aluminum (G. Macnab and J. S. Harrington, Nature 214, 522-3 (1967), and certain acidic polymers (R. J. Schnitzer and F. L. Pundsack, Environmental Research 3, 1-14 (1970).

Some of these known materials, such as EDTA, are solubilized in body fluids and do not reduce the long term haemolytic activity of the asbestos. There is therefore a need to determine materials which will adhere to the asbestos and reduce its haemolytic activity. Such passivating materials should not adversely affect the useful commercial properties of asbestos.

More recently, it has also been found that asbestos fibers with at least one metal molybdate (U.S. Pat. No. 4,171,405) or metal tungstate (U.S. Pat. No. 4,168,347) deposited thereon have reduced haemolytic activity in comparison with untreated asbestos fibers.

It should also be appreciated that in conceiving a treatment of asbestos fibers to reduce their cytotoxic and haemolytic activity, some attention must be given to the cost involved, since in any treatment so developed, the cost of treatment must be such that the price of the treated asbestos fiber is not such that it is priced out of the market. One of the disadvantages of prior art treatments of asbestos fiber to reduce its haemolytic activity such as those prescribed in U.S. Pat. Nos. 4,171,405 and 4,168,346 is that such treatments generally involve carrying out the process in an aqueous medium with the disadvantage that, after the treatment, the water must be removed, the treated asbestos fiber washed and then dried thus increasing the cost of treatment to a point where no such treated asbestos fibers have yet been commercialized because of the high costs involved in their production. Another feature which adds to the cost of such fibers is the relatively high cost of molybdenum and tungsten salts which have to be used and which will contribute to double the cost of the thus treated asbestos fibers.

Accordingly, it would appear highly desirable to provide a modified asbestos fiber which would possess reduced haemolytic and cytotoxic activities along with a process allowing for the commercial production of such new fibers at a reasonable cost.

SUMMARY OF THE INVENTION

The present invention thus provides a novel chemically modified asbestos fiber containing from 0.5 to 5% by weight of phosphate groups affixed thereto.

The present invention also provides a method for treating asbestos fibers by depositing phosphate groups on at least a portion of the asbestos fibers. The thus treated asbestos fibers have been found to possess reduced haemolytic activity as evidenced by using red blood cells, and reduced cytotoxicity using the rat pulmonary macrophage test. Furthermore, it has also been found that the phosphated asbestos fibers of the present invention possess an unexpectedly high degree of freeness which correspondingly increases the drainage rate in aqueous slurries of products containing asbestos fibers such as in the manufacture of asbestos-cement products.

A further improved phosphated asbestos fiber can be obtained by subjecting the thus obtained phosphated asbestos fiber to a heat treatment between 300° and 500° C. It is surprising that this heat treatment decreases the cytotoxicity of the phosphated asbestos fiber of the present invention which is contrary to what has been reported when ordinary asbestos fibers are heated to a temperature of from about 500° C., where the toxicity of the fibers is substantially increased (Hayashi, H. Envir. Health Persp. 9:267-270, 1974).

The novel phosphated asbestos fibers of the present invention are characterized by the asbence of the characterizing peak at 1021 cm$^{-1}$ which is one of the three characterizing peaks of untreated asbestos fibers or of phosphated asbestos fibers prepared by the reaction of a phosphate salt with asbestos fibers in an aqueous medium as disclosed in U.S. Pat. No. 3,535,150, both of which possess characterizing peaks at 1080 cm$^{-1}$, 1021 cm$^{-1}$ and 954 cm$^{-1}$ when subjected to infrared analysis. In other words the novel phosphated fibers of the present invention have an infrared spectrum which exhibits substantially no absorption within the range of 954-1080 cm$^{-1}$.

It is also a feature of the present invention to provide for the incorporation of the phosphate-containing asbestos fibers in industrial products, thereby reducing the health hazards usually associated with the handling of asbestos fibers prior to their incorporation in industrial products, and thus confering to such industrial products the inherent safety factors of the novel phosphated fibers of the present invention.

DESCRIPTION OF THE PREFERRED EMBODIMENT

Figure 1:
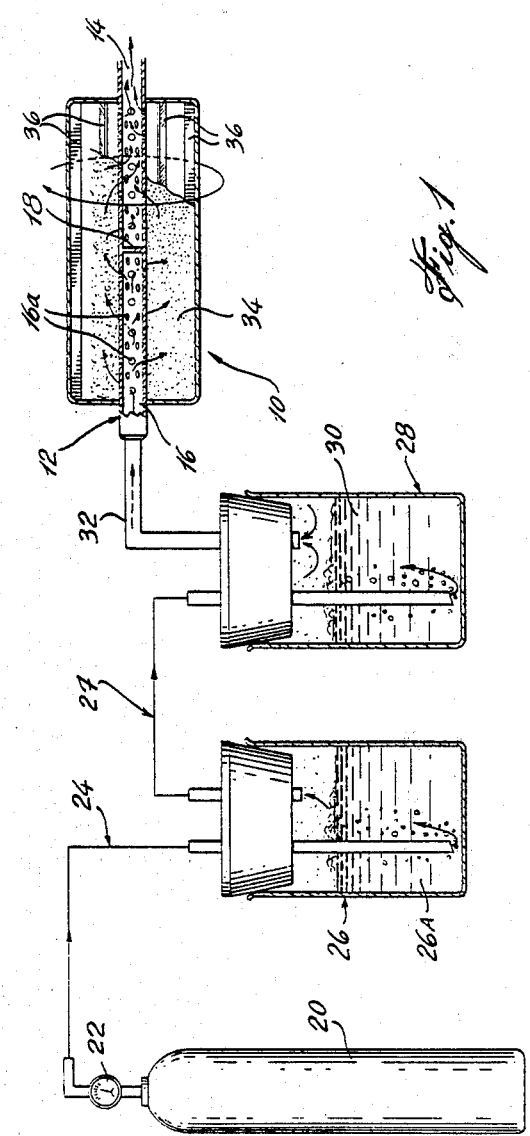

In accordance with the present invention, asbestos fibers are treated to deposit from 0.5 to 5% by weight of phosphate groups.

More specifically, the process of the present invention comprises contacting asbestos fibers under agitation with circulating dry vapors of a phosphorous compound selected from the group consisting of phosphorous oxychloride and phosphorous pentachloride in an inert atmosphere which is unreactive to the phosphorous compound vapors, whereby a portion of the terminal hydroxyl groups attached to the magnesium atoms are converted to phosphate groups, the amount of said phosphate groups being from 0.5 to 5% by weight of the treated fibers. The process of the present invention can be carried out at normal temperature and pressure.

Figure 2:
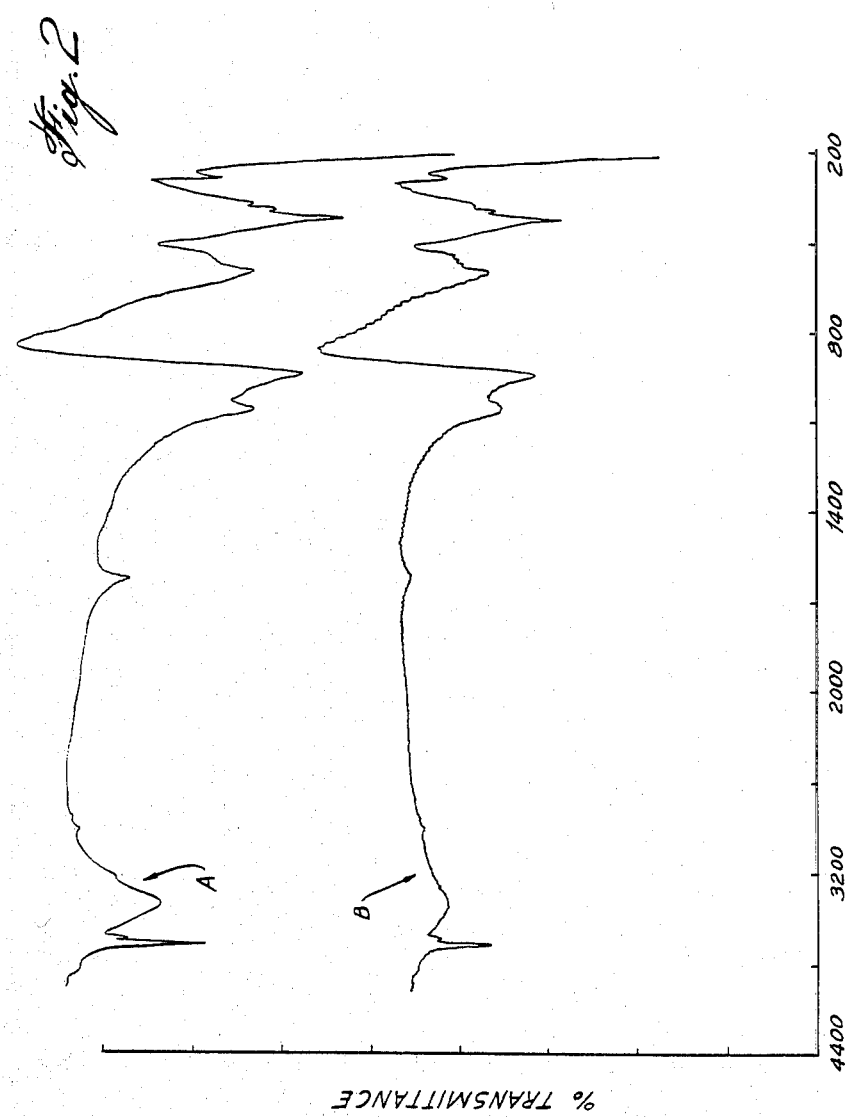

The present invention will be more readily understood by referring to the drawings wherein:

FIG. 1 is a schematic diagram of interconnected parts for use in the practice of the process of the present invention;

FIG. 2, where A is the infrared spectrum of asbestos fibers treated with phosphorous oxychloride in accordance with the present invention, and B is the infrared spectrum of asbestos fibers treated with phosphorous oxychloride in accordance with the present invention and then subjected to a heat treatment, and FIG. 3, where C is the infrared spectrum of natural and untreated asbestos fibers and D is the infrared spectrum of asbestos fibers treated with $NaH_2PO_4$ in an aqueous medium.

The term "asbestos" as used herein is intended to be applied to chrysotile asbestos which is the most important of the naturally occurring fibrous silicates and represents about 95% of the world's asbestos production, and the term "asbestos fibers" is intended to apply to commercial fibers of grades 2 to 7 (Quebec Standard). Essentially the asbestos fibers are those obtained directly from the separation from asbestos rocks.

The phosphorous compound selected is one which readily vaporizes at room temperature and of all the phosphorous compounds, only phosphorous oxychloride and phosphorous pentachloride are suitable. In practice, the phosphorous compound vapors are obtained by passing a non-reactive dry gas through the phosphorous compound whereby dry vapors of the phosphorous compound are entrained for reaction with the asbestos fibers.

The amount of phosphorous oxychloride or pentachloride gas used varies with the amount of asbestos fibers to be treated and the amount of phosphate it is desired to affix to the asbestos fibers. For example, for 50 grams of asbestos fibers placed in the reaction cylinder, a stream of dry nitrogen of about 2 liters per minute is passed through a bottle of phosphorous oxychloride for a period of 20 minutes whereby from 4 to 8 ml of phosphorous oxychloride are contacted with the asbestos fibers, thus yielding a modified asbestos fiber having from 0.5 to 1.5% by weight of phosphate groups affixed thereto. The amount of phosphorous compound in vapor form contacted with the asbestos fiber can be increased or decreased by increasing or decreasing the temperature of the phosphorous compound through which the inert carrying gas passes.

In practice, the reaction is carried out in a rotating container 10 having an inlet 12 and an outlet 14 and mixing blades 36 attached to the wall. The rotating means are not shown. The inlet 12 and the outlet 14 are connected with a perforated tube 16 which is closed at its center by wall 18. A nitrogen container 20 provided with a pressure gauge 22 adjusted to allow a flow of nitrogen under the desired pressure through conduit 24 to a closed container 26 of sulfuric acid 26a whereby the nitrogen gas is dehydrated, after which it is directed through conduit 27 to a closed container 28 of a solution of phosphorous oxychloride 30. As the pressure builds up in the rotating container 28, vapors of phosphorous oxychloride are directed to the central inlet 12 of the rotating container 10 through conduit 32. The vapors of phosphorous oxychloride permeate through the openings 16a of the central conduit 12, thus coming into contact with the rotating asbestos fibers 34 and any unreacted phosphorous oxychloride will flow out of the reaction container 10 through the opening of the second portion of the central tube 16. If desired the unreacted phosphorous oxychloride can be recycled. A further improved phosphated asbestos fiber can be obtained by heating the phosphated fibers at a temperature of from 300° to 500° C.

It is understood that the apparatus illustrated can be readily modified without departing from the concept of carrying out the reaction of the present invention.

A main advantage of the novel process of the present invention is that the reaction is carried out under dry conditions contrary to prior art procedures where the reaction was carried out in an aqueous medium thus requiring the expense of energy required to eliminate the water after the reaction has been completed.

The phosphate containing asbestos fibers obtained by the process of the present invention not only possess increased freeness, but have also been found to possess reduced haemolytic and cytotoxic effects. The fibers treated in accordance with the present invention along with untreated fibers and phosphated asbestos fibers prepared in an aqueous medium in accordance with the teachings of U.S. Pat. No. 3,535,150 were subjected to comparative tests to determine their haemolysis and cytotoxic activities.

Another aspect of the present invention is that the novel phosphated asbestos fibers reduce the hazards normally associated with the handling of asbestos fibers prior to their incorporation into industrial products and consequently this advantage will, to a high degree, be reflected in the industrial products made therefrom. Amongst the specific products in which the modified asbestos fibers prepared in accordance with the present invention can be incorporated and substituted for untreated asbestos fibers, there may be mentioned, wall boards, asbestos cement products, such as pipes, plates roofing tiles etc., friction materials such as brakes, brake pads, clutch facings, paper backings, yarn and woven material, gasket materials, felt for roofing or floor lining and insulating materials and the like.

BIOLOGICAL TESTS

The chemically modified phosphated asbestos fibers of the present invention, having retained their fibrous structure, were tested for possible alterations of their haemolytic and cytotoxic effects. All comparisons were made with the untreated chrysotile asbestos fibers samples, phosphated asbestos fibers prepared in accordance with U.S. Pat. No. 3,535,150 and the tests were conducted in the following manner:

HAEMOLYSIS

For each experiment, whole blood was obtained from the inferior vena cava of two ether-anaesthetized adult male Long Island rats (250–300 g/body weight). The whole blood was then immediately suspended in 400 ml of Veronal® buffer solution (290±5 mOsm) of pH 7.28. Erythrocytes were washed 3 times, and a 4% by volume suspension of the rat red blood cells (RBC) was prepared in the Veronal® buffer.

Weighed amounts of asbestos samples were suspended in 12.5 ml of Veronal® buffer using a Dounce® tube. The concentrations of fibers studied varied from 100 to 1000 μg/ml. Suspensions of dispersed fibers were placed in 30 ml Falcon® flasks with 12.5 ml of the RBC suspension (final concentration of RBC: 2%). Flasks were incubated at 37° C. in a Dubnoff® metabolic shaking incubator. From each test tube and control, 3 ml samples were taken after 15, 30 and 60 minutes of incubation. Samples were centrifuged for 5 minutes to precipitate ghosts and intact RBC. One ml of supernatant was diluted with 3 ml of Veronal® buffer and the absorbance was determined at 541 nm. Complete haemolysis was obtained by the addition of Triton® X-100 to a 2% suspension of RBC in distilled water, and determined as described before.

CYTOTOXICITY

For the procurement of rat alveolar macrophages, the cells were harvested by bronchoalveolar lavages. Male Long-Evans black hooded rats (250–300 g/body weight) were killed by an i.p. overdose of sodium pentobarbital. After tracheotomy, serial lung lavages were carried-out in situ by instillating calcium- and magnesium- free Hanks'® balanced salt solution (pH 7.4 at 37° C.) supplemented with glucose (1 g/l).

Free lung cells ($\geq 10^7$ cells/rat) were isolated by low speed centrifugation and resuspended in a solution of isotonic $NH_4Cl$ for 10 min. on ice. This step was introduced to rule out any contamination by RBC. After serial washings, the cells ($\geq 95\%$ macrophages) were counted on a haemocytometer and the viability (93–97%) was estimated by the trypan blue test (0.4% solution). Unless otherwise mentioned, all operations were performed at 4° C. and with sterilized material.

The cells ($10^6$ cells/2.5 ml of medium) were then incubated at 37° C. for 24 hrs in covered siliconized glass vials. The incubation was performed in filtered normal air and the humidity in the incubation chamber was maintained around 80%. The alveolar macrophages were incubated in sterile MEM medium (Hanks' salts) supplemented with 10 mM $CaCl_2$ and 10 mM $MgCl_2$, 2 mM L-Glutamine, 4% (V/V) heat-inactivated foetal calf serum and antibiotics (initial pH: 6.8 at 37° C.).

Each fibrous material was autoclaved for 45 min. at 121° C. before its use and gently resuspended in sterile MEM medium with a Dounce® glass homogenizer. Aliquots up to 250μ/$10^6$ cells (10, 40 and 100 μg/ml of incubation medium) were selected for the assay.

After a 24 hrs incubation period, the cell-free incubation mediums were collected and assayed for:
  Cell viability (membrane integrity)
  Lactic Dehydrogenase, or LDH (cytoplasmic leakage)
  B-N-Acetylglucosaminidase, or B-NAG (lysosomal damage).

All spectrophotometric analyses were done on a double-beam spectrophotometer.

It is seen from TABLE I that contact of red blood cells (RBC) with untreated chrysotile, or with $NaH_2PO_4$-treated chrysotile leads to a 82%, 72% and 57% degree of haemolysis respectively when compared to control, whereas treatment with $POCl_3$-treated fibers results in a 16% degree of haemolysis, after 15 min. of contact.

Concurrently, TABLE II shows the effects on parameters of pulmonary macrophage response, which are widely accepted as indices of cytotoxicity: viability, and enzyme leakage after exposure to the mineral fibers. It can be seen that at all levels of treatments, all the parameters show a definite decrease in the cytotoxic effects produced by $POCl_3$-treated fibers when compared to those produced by untreated or $NaH_2PO_4$-treated fibers.

These data must be viewed in the light of the observation that there is a good correlation between the haemolytic potential, the effect on macrophage and the fibrogenic activity of mineral dusts, including asbestos (Allison, A. C. et al., 1977, Ann. Rheum. Dis. 36 (Suppl.) 8). Furthermore, it has been shown (Chamberlain, M. et al., 1978, Br. J. Exp. Path. 59:183–189) that there is a correlation between the cytotoxic activities of mineral dusts and their ability to induce mesothelial tumors.

TABLE 1

EFFECTS OF DIFFERENT PHOSPHATE TREATMENT OF ASBESTOS FIBERS ON RED BLOOD CELL HAEMOLYSIS

| TREATMENTS (1000 μg/ml) | PERCENTAGE HAEMOLYSIS AFTER | | |
|---|---|---|---|
| | 15 min. | 30 min. | 60 min. |
| None | 2 | 3 | 4 |
| Untreated chrysotile | 82 | 84 | 85 |
| Chrysotile (5.4% $NaH_2PO_4$)* | 72 | 76 | 78 |
| Chrysotile (1.5% $NaH_2PO_4$)* | 57 | 65 | 70 |
| $POCl_3$-treated chrysotile | 16 | 26 | 38 |

*Prepared according to procedure of U.S. Pat. No. 3,535,150

TABLE 2

EFFECTS OF DIFFERENT PHOSPHATE TREATMENTS OF CHRYSOTILE ON RAT PULMONARY ALVEOLAR MACROPHAGES

| Parameters 24 hrs incubation period | Concentration of fibres μg/ml | Untreated | $NaH_2PO_4$ 1.5%* | $NaH_2PO_4$ 5.4%* % of control[1] | $POCl_3$** | $POCl_3$ (500° C.)** |
|---|---|---|---|---|---|---|
| (A) VIABILITY | 10 | 83 | 57 | 72 | 82 | 97 |
| | 40 | 57 | 52 | 48 | 81 | 91 |
| | 100 | 44 | 42 | 42 | 57 | 72 |
| (B) LDH | 10 | 141 | 240 | 158 | 201 | 111 |
| | 40 | 355 | 375 | 383 | 228 | 175 |

TABLE 2-continued

EFFECTS OF DIFFERENT PHOSPHATE TREATMENTS OF CHRYSOTILE ON RAT PULMONARY ALVEOLAR MACROPHAGES

| Parameters 24 hrs incubation period | Concentration of fibres µg/ml | Untreated | NaH$_2$PO$_4$ 1.5%* | NaH$_2$PO$_4$ 5.4%* % of control[1] | POCl$_3$** | POCl$_3$ (500° C.)** |
|---|---|---|---|---|---|---|
| (C) β-NAG | 100 | 550 | 594 | 513 | 416 | 194 |
|  | 10 | 255 | 366 | 305 | 208 | 101 |
|  | 40 | 915 | 1081 | 1223 | 319 | 207 |
|  | 100 | 1801 | 2348 | 2060 | 1192 | 407 |

[1]In a control incubation, the pulmonary alveolar macrophages were incubated as described in the text, but without addition of any fibrous material to the incubation medium.
ORIGINAL UNITS:
(A) Percentage of living macrophages after 24 hrs incubation (Ex: 88% for control).
(B) International mUnits (Ex: 10.6 mIU for control).
(C) nmoles p-nitrophenoxide produced/min (Ex: 0.2 units for control).
*Phosphate treatments according to U.S. Pat. No. 3,535,150.
**Phosphate treatments according to claim described herein.

It is noteworthy that the passivation of biological effects, observed after treatment with POCl$_3$-treated fibers, relates with the disappearance of the characterizing peak at 1021 cm$^{-1}$ of the infrared spectrum. This phenomenon has been observed by Langer Selikoff et al., (1978) J. Toxicol. Env. Health 4:173–188, when chrysotile was submitted to ball-milling to produce short fibers for experimental purposes. The resulting fibers were far less haemolytic, and this coincided with an alteration of i.r. spectral data, precisely at 1021 cm$^{-1}$ and were in fact described as no longer asbestos.

Consequently, since two basically different methods of modifying fiber, i.e.: a mechanical treatment and a chemical treatment both gave much decreased biological activity associated with the alteration of the peak at 1021 cm$^{-1}$ (±2 cm$^{-1}$), it is obvious that biological activity is related to a structural feature in chrysotile, giving absorption at that frequency in the infrared. Therefore any treatment of the chrysotile fiber, either physical or chemical, inducing a decrease or a disappearance of the absorption characteristic around 1021 cm$^{-1}$ in the infrared, should result in a substantial passivation of cytotoxic effects of such treated fiber.

Contrary to mechanical treatment, which at the same time induces severe destruction of the fibrous structure of chrysotile and decreases the physiological activity of the resulting material, treatment with POCl$_3$, while deactivating the fiber, leaves its fibrous structure essentially intact.

The following examples are given to illustrate the preparation of the modified asbestos fiber.

EXAMPLE 1

50 grams of the asbestos fiber (Grade 4T30 Quebec Standard) prepared sample were placed in a tumbler made of a plexiglass cylinder (30 cm × 12 cm) sealed at both ends. Inside the cylinder are a number of fixed blades as shown in FIG. 1. A stainless steel tubing is inserted through both ends of the cylinder. Through a first set of holes in the tubing, the vapors of the gas are released inside the tumbler, and exit through another set of holes at the other end of the tubing. The tumbler is rotated at a rate of 33 RPM, by any convenient mechanical device.

A controlled (2 l/min) stream of nitrogen dried by bubbling through a bottle of H$_2$SO$_4$ is passed through a bottle of phosphorous oxychloride (POCl$_3$) at room temperature. The POCl$_3$ vapors are carried along with the nitrogen stream into the rotating tumbler, thus affording a very discrete contact of the POCl$_3$ vapors with the fibers. The treatment is pursued until approximately 4 to 8 ml of the POCl$_3$ have been used. Then the fibers are purged with nitrogen only for a few hours, and are finally removed from the tumbler, and placed in a humidity chamber overnight to hydrolyze excess chlorides.

Analysis of PO$_4$ content the treated fibers (Chemical Analysis Vol. 8 DF Boltz ed. method D p. 38, 1958) shows that between 1.5% by weight of PO$_4$ have been fixed onto the fibers.

EXAMPLE 2

The phosphated fibers of Example 1 were divided in two lots. One lot was heated in an oven at 325° C. for a period of one hour after which all the fibers in the oven were at 325° C.

Separate infrared analyses were performed with untreated asbestos fibers, asbestos fibers phosphated in accordance with the procedure of U.S. Pat. No. 3,535,150, and asbestos fibers prepared according to Examples 1 and 2 herein.

The presence or absence of relevant peaks is reported in Table 3.

TABLE 3

| Fiber | I.R. characterizing peaks in cm$^{-1}$ | | | i.r. spectrum |
|---|---|---|---|---|
|  | 1080 | 1021 | 954 |  |
| 1. untreated asbestos fibers | yes | yes | yes | FIG. 3C |
| 2. phosphated asbestos fibers (wet process B.P. 1,143,842) | yes | yes | yes | FIG. 3D |
| 3. fibers of Example 1 | yes | no | yes | FIG. 2A |
| 4. treated fibers of Example 2 | yes | no | yes | FIG. 2B |

It will be observed that the phosphated asbestos fibers of the present invention are characterized by the absence of the characterizing peak at 1021 cm$^{-1}$ which is observed in untreated asbestos fibers and asbestos fibers which have been phosphated in an aqueous medium.

We claim:

1. A process for preparing a modified chrysotile asbestos fiber containing from 0.5 to 5% by weight of phosphate groups, which comprises contacting chrysotile asbestos fibers under dry conditions and agitation with vapors of a phosphorous compound selected from the group consisting of phosphorous oxychloride and phosphorous pentachloride in an atmosphere inert to the phosphorous compound whereby a portion of the hydroxyl groups of the asbestos fiber are converted to phosphate groups, the amount of said phosphate groups being from 0.5 to 5% by weight of the fiber.

2. A process as in claim 1, where the source of phosphorous compound is a phosphorous oxychloride.

3. The process of claim 1 or 2, wherein the phosphated asbestos fibers obtained are heated to a temperature of from 300° to 500° C.

4. Asbestos fibers having phosphate groups bonded on the fibers in an amount of about 0.2 to 5% by weight based on the dry fibers, said phosphated asbestos fibers being characterized by the absence of the characterizing peak located at 1021 cm$^{-1}$ obtained by the infrared analysis as shown in spectrum A of FIG. 2 of untreated asbestos fibers and of phosphated asbestos fibers obtained by phosphating asbestos fibers in an aqueous medium.

5. Heat treated asbestos fibers having a portion of the hydroxyl groups substituted by from about 0.2 to about 5.0% by weight of phosphate groups based on the weight of the dry asbestos fibers, said heat treated phosphated asbestos fibers being characterized by the absence of the characterizing peak located at 1021 cm$^{-1}$ in the infrared analysis as shown in spectrum B of FIG. 2 of untreated asbestos fibers and of phosphated asbestos fibers obtained by phosphating asbestos fibers in an aqueous environment.

6. A phosphated asbestos fiber containing from 0.5 to 5% by weight of phosphate groups, said phosphated fiber being characterized as in FIG. 2, Spectrum A.

7. A phosphated asbestos fiber containing from 0.5 to 5% by weight of phosphate groups, said phosphated fiber having been heat treated at a temperature of from 300° to 500° C. and being characterized as in FIG. 2, Spectrum B.

* * * * *